(12) United States Patent
Hara et al.

(10) Patent No.: US 8,065,932 B2
(45) Date of Patent: Nov. 29, 2011

(54) BICYCLE COMPONENT ACTUATING DEVICE

(75) Inventors: Nobukatsu Hara, Osaka (JP); Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 421 days.

(21) Appl. No.: 12/267,729

(22) Filed: Nov. 10, 2008

(65) Prior Publication Data

US 2009/0064813 A1  Mar. 12, 2009

Related U.S. Application Data (63) Continuation-in-part of application No. 11/749,245, filed on May 16, 2007, now Pat. No. 7,806,022.

(51) Int. Cl.
*F16C 1/12* (2006.01)

(52) U.S. Cl. ...................................... 74/502.2

(58) Field of Classification Search ................ 74/500.5, 74/501.6, 502.2, 519; 280/276, 285
See application file for complete search history.

(56) References Cited

U.S. PATENT DOCUMENTS

| | | | | |
|---|---|---|---|---|
| 5,682,794 | A | * | 11/1997 | Shibata ........................... 74/489 |
| 5,775,168 | A | | 7/1998 | Furuta |
| 5,802,923 | A | | 9/1998 | Hara |
| 5,862,709 | A | | 1/1999 | Kageyama |
| 6,209,413 | B1 | | 4/2001 | Chang |
| 6,331,089 | B1 | * | 12/2001 | Iteya .............................. 403/56 |
| 6,450,060 | B1 | | 9/2002 | Shahana |
| 6,729,203 | B2 | | 5/2004 | Wesling et al. |
| 6,767,024 | B1 | | 7/2004 | Kuo |
| 6,848,335 | B1 | | 2/2005 | Kawakami |
| 7,146,874 | B2 | | 12/2006 | Shahana et al. |
| 7,194,928 | B2 | | 3/2007 | Kawakami |
| 2005/0103149 | A1 | | 5/2005 | Hunt et al. |
| 2005/0126329 | A1 | | 6/2005 | Blaschke |
| 2005/0269178 | A1 | | 12/2005 | Hung |

FOREIGN PATENT DOCUMENTS

| | | |
|---|---|---|
| DE | 9212927 U1 | 11/1992 |
| DE | 19532088 A1 | 3/1997 |
| DE | 20 2006 005454 U1 | 6/2006 |
| EP | 0768234 A1 | 4/1997 |
| EP | 0816217 A2 | 1/1998 |
| EP | 1 129 937 A2 | 9/2001 |
| EP | 1 992 556 A1 | 11/2008 |
| FR | 2701917 A1 * | 9/1994 |

* cited by examiner

*Primary Examiner* — Vicky Johnson
(74) *Attorney, Agent, or Firm* — Global IP Counselors, LLP (57) ABSTRACT

A bicycle component actuating device is provided with a base member, a first user operating member and a locking member. The base member includes a tube mounting structure having a tube receiving bore with a center mounting axis. The first user operating member is rotatably mounted relative to the base member for rotation between a first operating position and a second operating position about a rotational axis that is parallel to and offset from the center mounting axis of the tube mounting structure. The locking member is movably mounted relative to the base member for selective movement between a locking position to lock the first user operating member in the second operating position and a releasing position to release the first operating member from the second operating position.

19 Claims, 13 Drawing Sheets

BICYCLE COMPONENT ACTUATING DEVICE

CROSS-REFERENCE TO RELATED APPLICATIONS

This application is a continuation-in-part application of U.S. patent application Ser. No. 11/749,245, filed on May 16, 2007. The entire disclosure of U.S. patent application Ser. No. 11/749,245 is hereby incorporated herein by reference.

BACKGROUND OF THE INVENTION

1. Field of the Invention

This invention generally relates to a bicycle component actuating device for operating a bicycle component. More specifically, the present invention relates to a bicycle component actuating device that has a pair of operating members that are conveniently located for a user.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames which typically transmitted the shocks resulting from rough riding surfaces directly to the rider. In other words, most bicycles were not provided with any front or rear suspension. Recently, bicycles, especially mountain bikes (MTB) and all terrain bikes (ATB), have been outfitted with front and/or rear suspension assemblies to absorb the shocks transmitted to the rider when riding on a rough road.

In these bicycles with suspensions, it is sometimes desirable to be able to quickly adjust or lockout the suspension as needed and/or desired. Thus, there have been proposals to provide a suspension actuating device on the handlebar of the bicycle so that the rider can adjust or lockout the suspension as needed and or desired while riding. Three examples of actuating devices for bicycle suspensions are disclosed in U.S. Pat. No. 6,767,024, U.S. Patent Publication No. 2005/0103149 and U.S. Patent Publication No. 2005/0252330. While these actuating devices are functional, it is desirable to provide an actuating device that is simple to operate with distinct operating motions for switching between a first operating position (e.g., a first suspension setting position) and a second operating position (e.g., a second suspension setting position).

In view of the above, it will be apparent to those skilled in the art from this disclosure that there exists a need for an improved bicycle component actuating device. This invention addresses this need in the art as well as other needs, which will become apparent to those skilled in the art from this disclosure.

SUMMARY OF THE INVENTION

One object of the present invention is to provide a bicycle component actuating device that has distinct operating motions for switching between a first operating position and a second operating position.

Another object of the present invention is to provide a bicycle component actuating device that is conveniently located for a user to switch between a first operating position and a second operating position while riding.

The foregoing objects can basically be attained by providing a bicycle component actuating device that includes a base member, a first user operating member and a locking member. The base member includes a tube mounting structure having a tube receiving bore with a center mounting axis. The first user operating member is rotatably mounted relative to the base member for rotation between a first operating position and a second operating position about a rotational axis that is parallel to and offset from the center mounting axis of the tube mounting structure. The locking member is movably mounted relative to the base member for selective movement between a locking position to lock the first user operating member in the second operating position and a releasing position to release the first operating member from the second operating position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
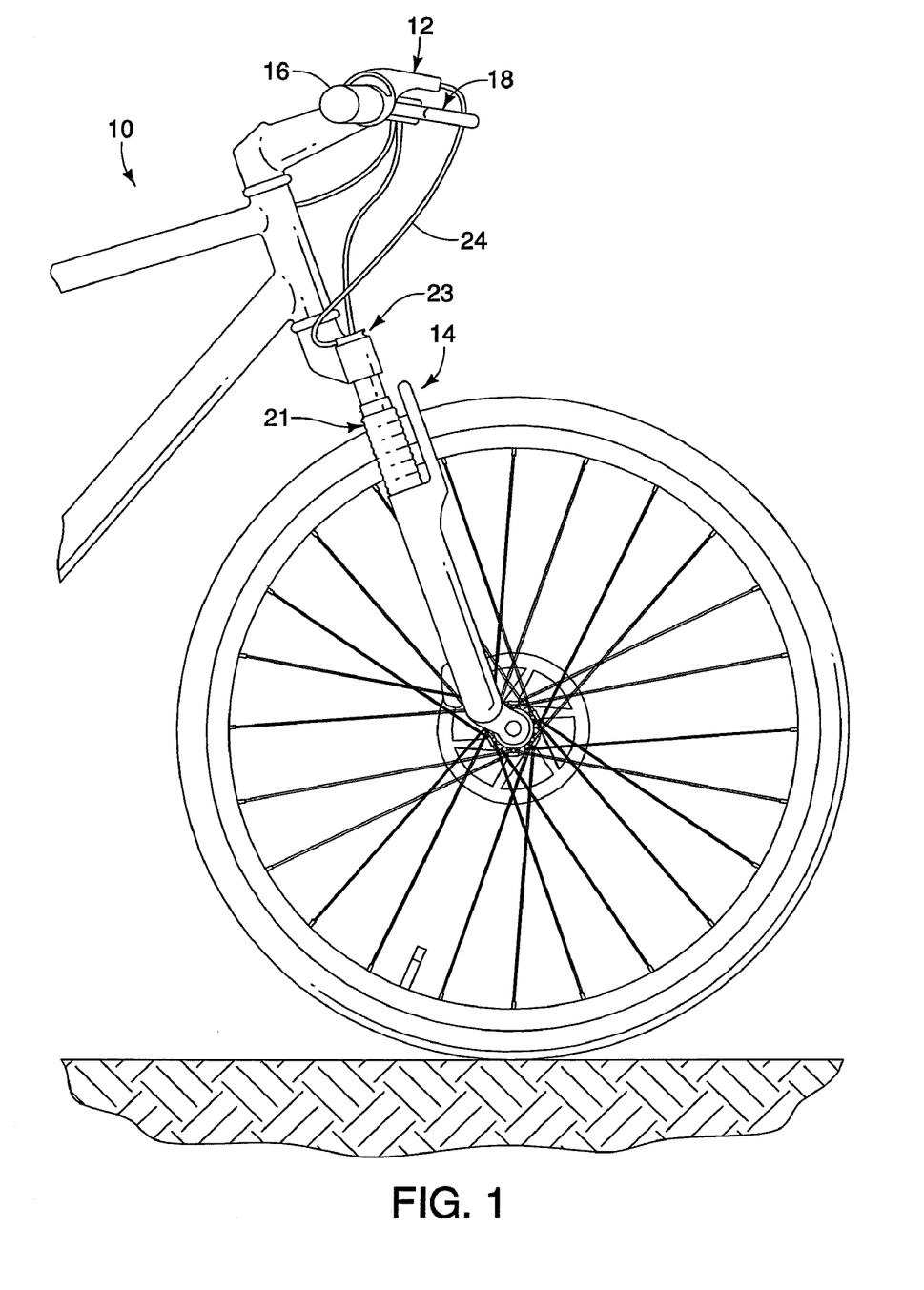
FIG. 1 is a partial side elevational view of a front portion of a bicycle with a bicycle component actuating device in accordance with one embodiment.
Figure 2:
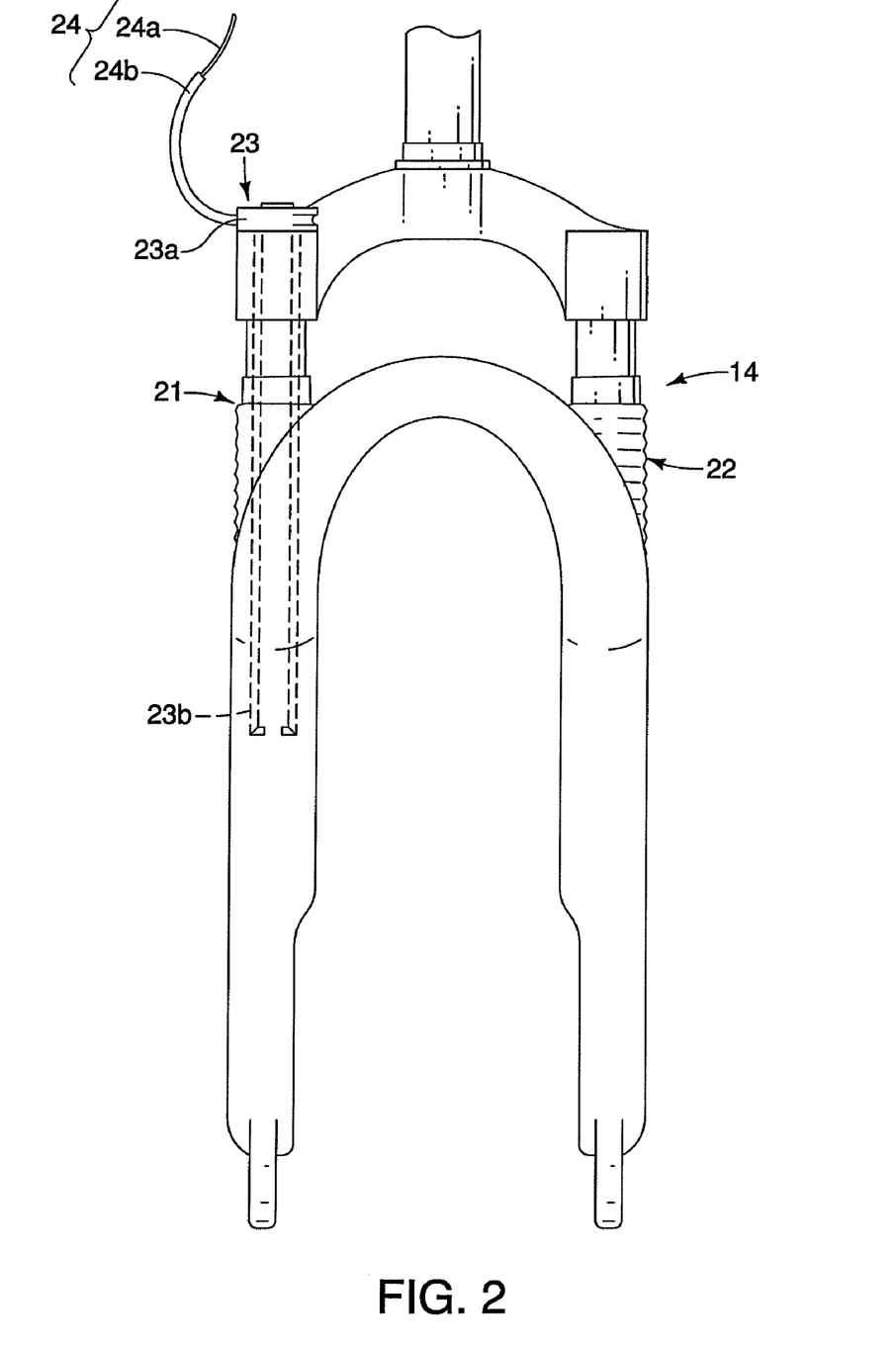
FIG. 2 is a front elevational view of a front suspension that is operated by the bicycle component actuating device in accordance with one embodiment.
Figure 3:
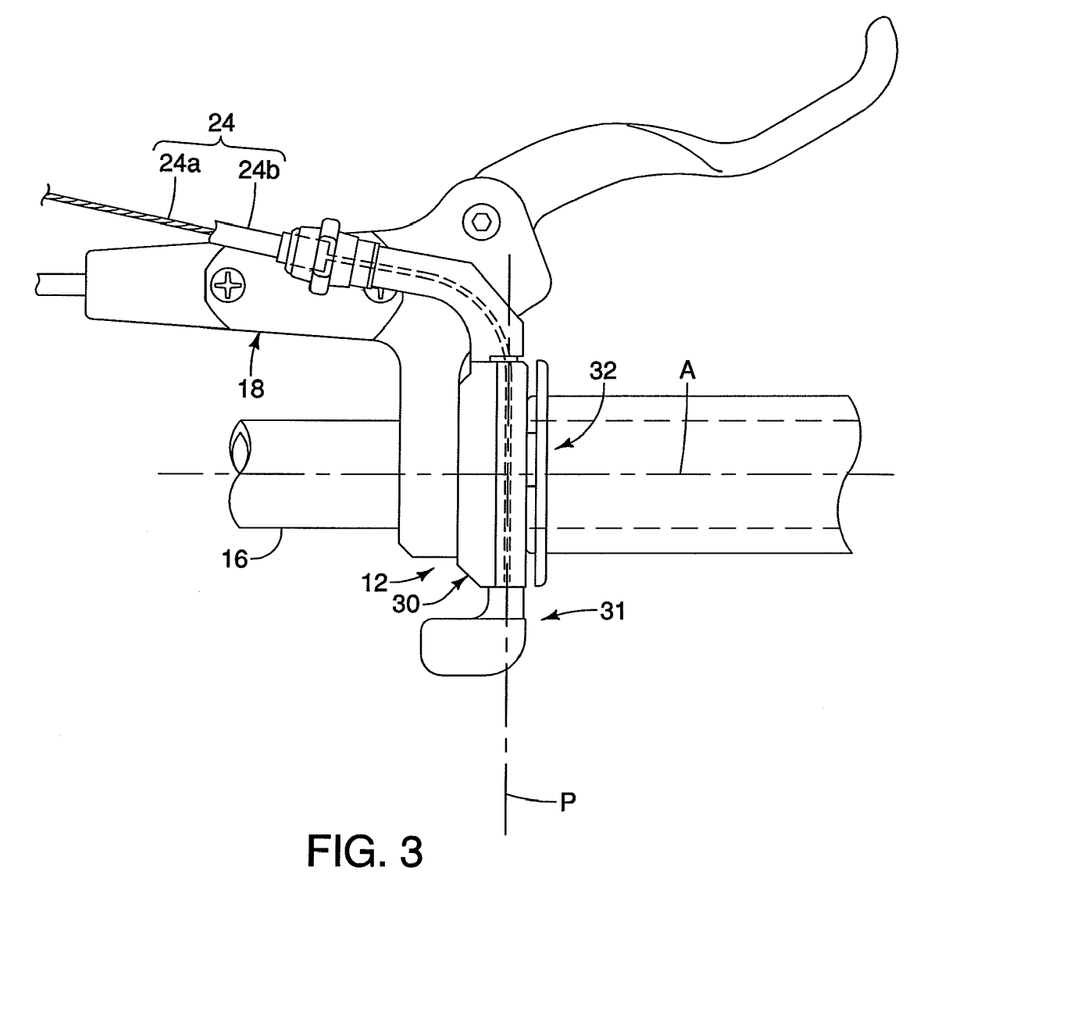
FIG. 3 is a top plan view of the bicycle component actuating device mounted to a handlebar adjacent a hydraulic brake lever.
Figure 4:
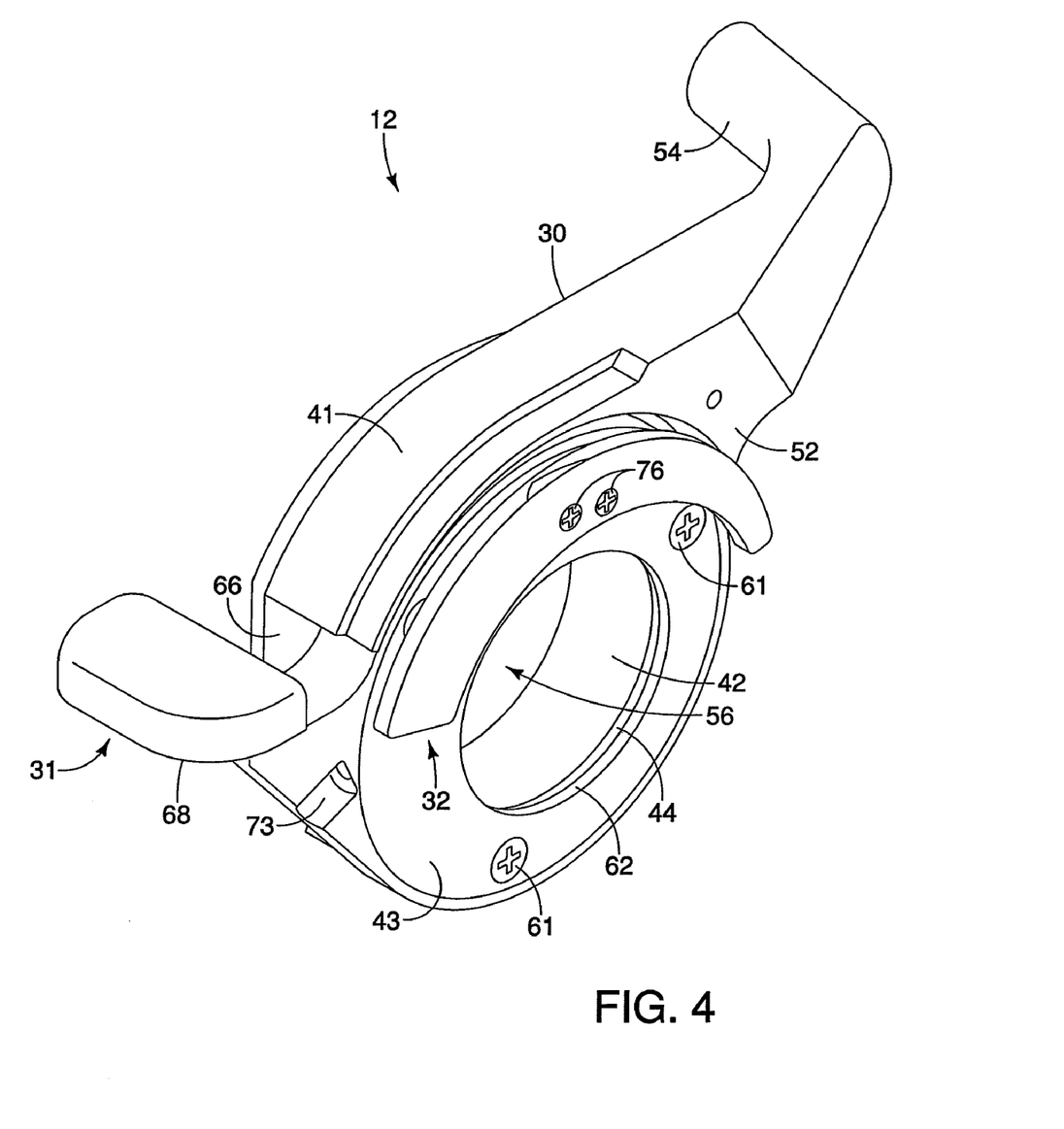
FIG. 4 is a side perspective view of the bicycle component actuating device illustrated in FIG. 3.

Referring initially to FIGS. 1 to 3, a bicycle 10 is illustrated that is equipped with a bicycle component actuating device 12 for selectively controlling a front suspension 14 in accordance with a first embodiment. In particular, the bicycle component actuating device 12 is mounted on a handlebar 16 of the bicycle 10, and is operatively coupled to the front suspension 14 to selectively switch between a first operating position (e.g., a first suspension setting position) and a second operating position (e.g., a second suspension setting position). While the bicycle component actuating device 12 is illustrated for controlling a front suspension, the bicycle component actuating device 12 is not limited to being used to control a front suspension. The bicycle component actuating device 12 can be for controlling other components. For example, the bicycle component actuating device 12 can be used as part of a releasing mechanism of a bicycle shifting device having a plurality of shifting positions.

As seen in FIG. 2, the front suspension 14 has a pair of telescopic tubes 21 and 22 for absorbing shocks while riding the bicycle 10 over rough terrain. The telescopic tube 21 is provided with a suspension setting mechanism 23 for selectively setting the front suspension 14 to control expansion and contraction of the telescopic tubes 21 and 22. The suspension setting mechanism 23 is provided with a cable operated adjustment knob 23a and an actuated member 23b. Cable operated suspension setting mechanism are known in the bicycle field, and thus, the precise structure of the suspension setting mechanism 23 will not be discussed or illustrated in detail herein. Preferably, the suspension setting mechanism 23 is one of the following: a suspension lockout mechanism, a suspension damping mechanism, a suspension spring adjustment mechanism, or a suspension stroke adjustment mechanism. In the case of the suspension setting mechanism 23 being a suspension lockout mechanism, the first and second operating positions correspond to a suspension operating position and a suspension lockout mechanism in which the expansion and contraction of the telescopic tubes 21 and 22 is selectively locked and unlocked. In the case of the suspension setting mechanism 23 being a suspension damping mechanism, the first and second operating positions correspond to suspension setting conditions in which the damping characteristics are adjusted between first and second damping characteristics such as a low damping characteristic and a high damping characteristic. In the case of the suspension setting mechanism 23 being a suspension spring adjustment mechanism the first and second operating positions correspond to suspension setting conditions in which the spring characteristics are adjusted between first and second spring-rate characteristics such as a low spring-rate characteristics and a high spring-rate characteristic. In the case of the suspension setting mechanism 23 being a suspension stroke adjustment mechanism, the first and second operating positions correspond to suspension setting conditions in which the stroke characteristics are adjusted between first and second characteristics such as a short stroke characteristics and a long stroke characteristic. Moreover, it will be apparent to those skilled in the art from this disclosure that the bicycle component actuating device 12 can be used with a rear suspension. In other words, a pair of the bicycle component actuating devices 12 can be provided on a single bicycle with one controlling a front suspension and the other controlling the rear suspension as needed and/or desired.

In the illustrated embodiment, the bicycle component actuating device 12 is configured and arranged to operate to the adjustment knob 23a for selectively locking and unlocking the front suspension 14. Thus, the bicycle component actuating device 12 is preferably connected to the adjustment knob 23a by a control cable 24 that has an inner wire 24a and an outer casing 24b. The inner wire 24a is pulled by the bicycle component actuating device 12 to switch the front suspension 14 from the first operating position (e.g., an unlocked position, a low damping characteristic position, a low spring-rate position or a short stroke position) to the second operating position (e.g., a locked position, a high damping characteristic position, a high spring-rate position and a long stroke position). The inner wire 24a is released by the bicycle component actuating device 12 to switch the front suspension 14 from the second operating position (e.g., a locked position, a high damping characteristic position, a high spring-rate position and a long stroke position) to the first operating position (e.g., an unlocked position, a low damping characteristic position, a low spring-rate position or a short stroke position).

Referring now to FIGS. 4 to 11, the bicycle component actuating device 12 will be discussed in more detail. The bicycle component actuating device 12 basically includes a base member 30, a first user operating member 31, a second user operating member 32, a biasing element 33, a pinion 34 and a locking member 35. The second user operating member 32, the biasing element 33 and the locking member 35 basically cooperate together to form a release/locking mechanism. With this illustrated embodiment, the base member 30 is formed of a main body part 41, a tube clamp 42, a cover part 43 and an inner support ring 44.

As seen in FIG. 3, the bicycle component actuating device 12 is mounted to the handlebar 16 via the tube clamp 42 of the base member 30. In other words, the base member 30 is a stationary member that is fixedly mounted to an end portion of the handlebar 16 via the tube clamp 42 of the base member 30. Tube clamps are well known in the bicycle field, and thus, the tube clamp 42 will not be discussed in detail herein. The main body part 41 includes a tube clamp recess 48 formed in one side of the main body part 41. The tube clamp 42 is retained in the tube clamp recess 48 (FIG. 13) by a bolt 50 that is also used to tighten the tube clamp 42 on the handlebar 16.

The base member 30 is positioned on the handlebar 16 so that the rider can easily operate the first and second user operating members 31 and 32 without the rider's hand leaving the handlebar 16. Generally speaking, the first user operating member 31 has an operating path that curves about a center axis of the handlebar 16, while the release/locking mechanism has an operating path of that extends linearly (e.g., parallel) with respect to the center axis of the handlebar 16, as explained below.

Figure 8:
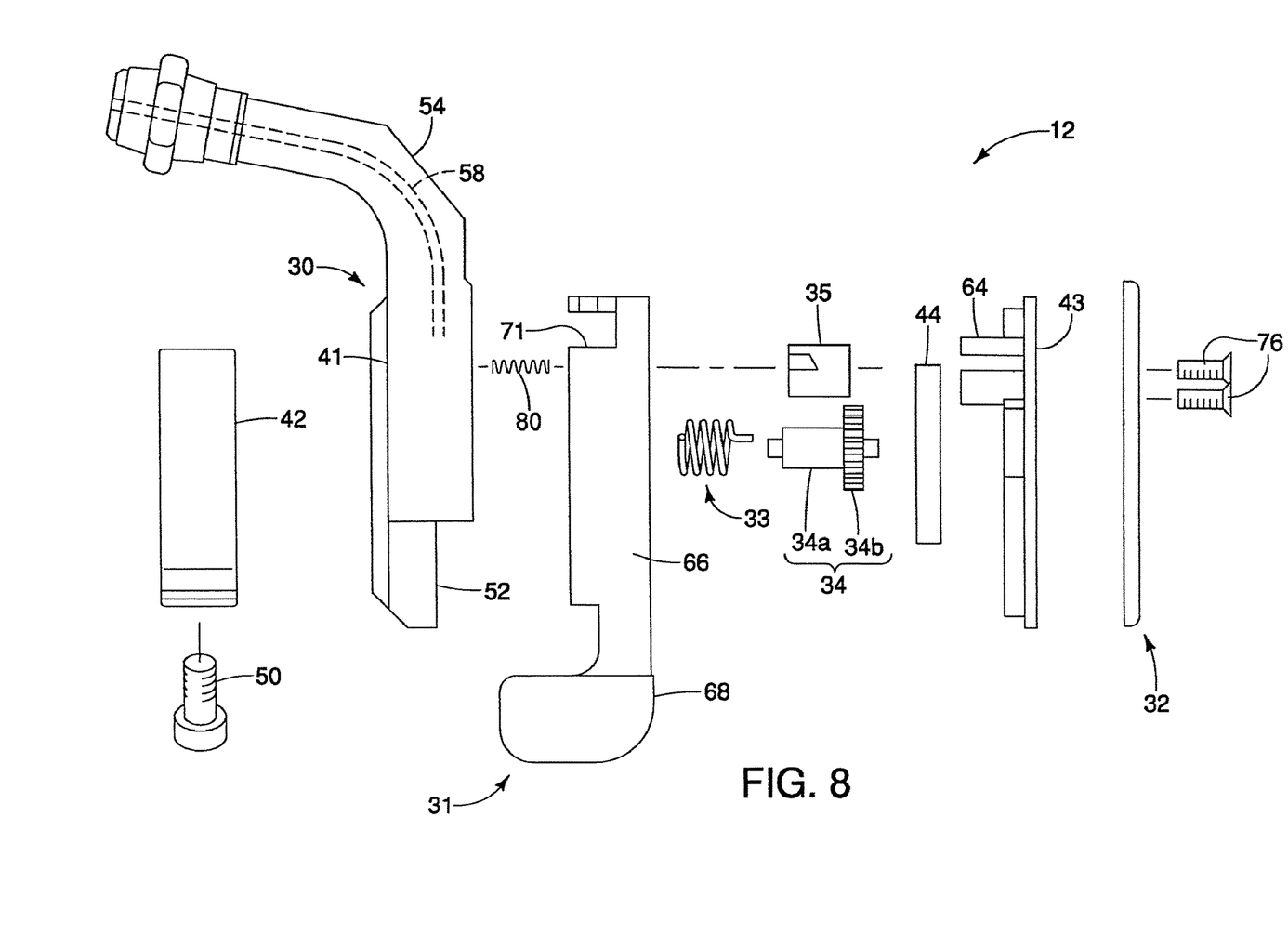
FIG. 8 is an exploded top plan view of the bicycle component actuating device illustrated in FIGS. 4 to 8.
Figure 9:
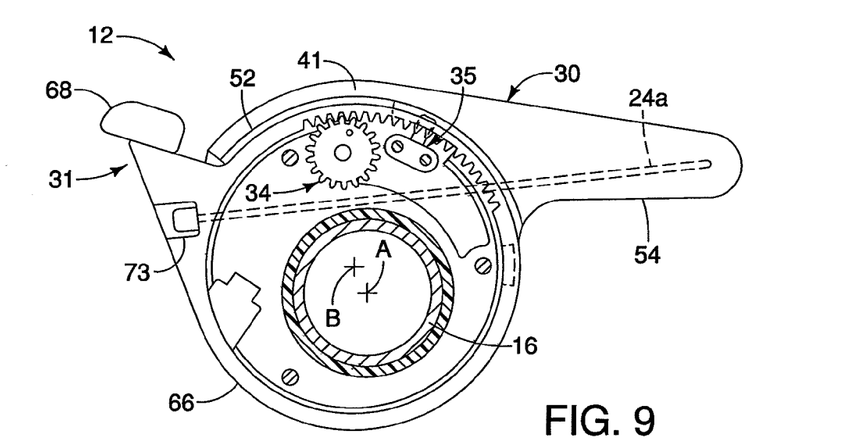
FIG. 9 is a side elevational view of the bicycle component actuating device in a partially assembled state, in which the first user operating member and the pinion are mounted to the base member prior to preloading the biasing element that urges the first user operating member in the clockwise direction in this illustration.
Figure 10:
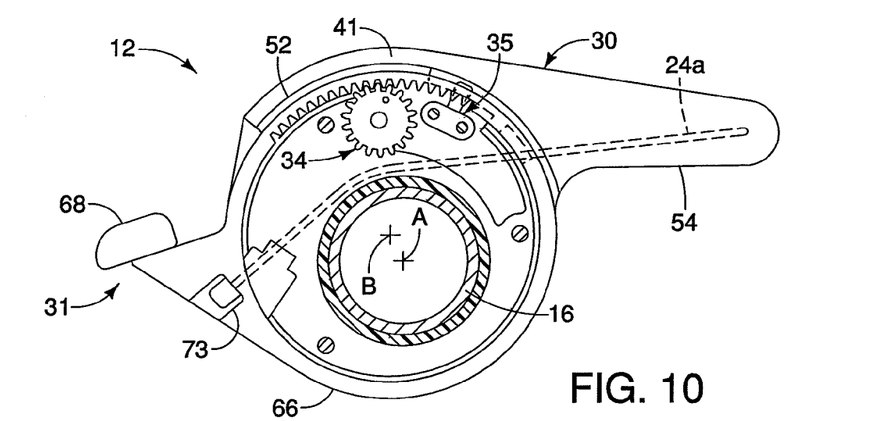
FIG. 10 is a side elevational view, similar to FIG. 9, of the bicycle component actuating device in a partially assembled state, but with the first user operating member between rotated from the first operating position state towards a second operating position state.
Figure 11:
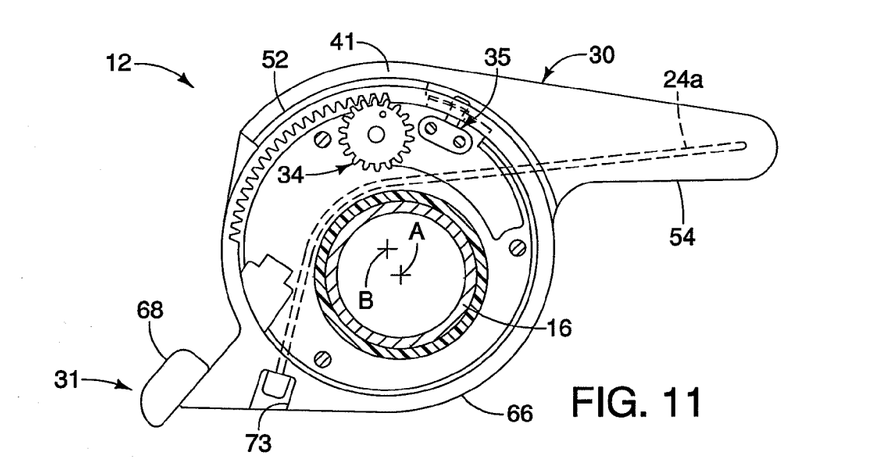
FIG. 11 is a side elevational view, similar to FIGS. 9 and 10, of the bicycle component actuating device in a partially assembled state, but with the first user operating member in the second operating position state in which the front suspension is in one of a suspension lockout position, a high damping characteristic position, a high spring-rate position and a long stroke position.
Figure 12:
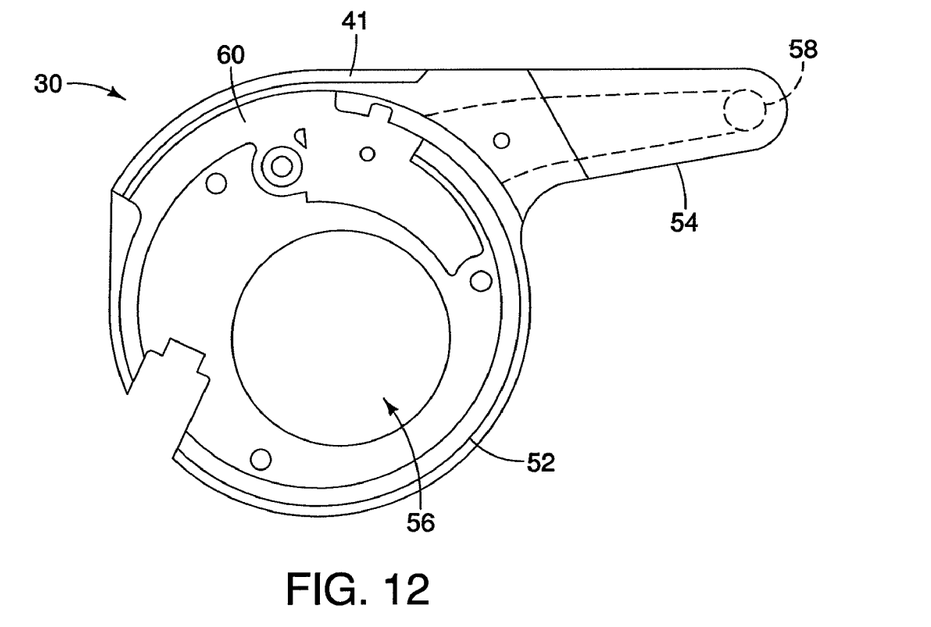
FIG. 12 is a first side elevational view of the base member of the bicycle component actuating device.
Figure 13:
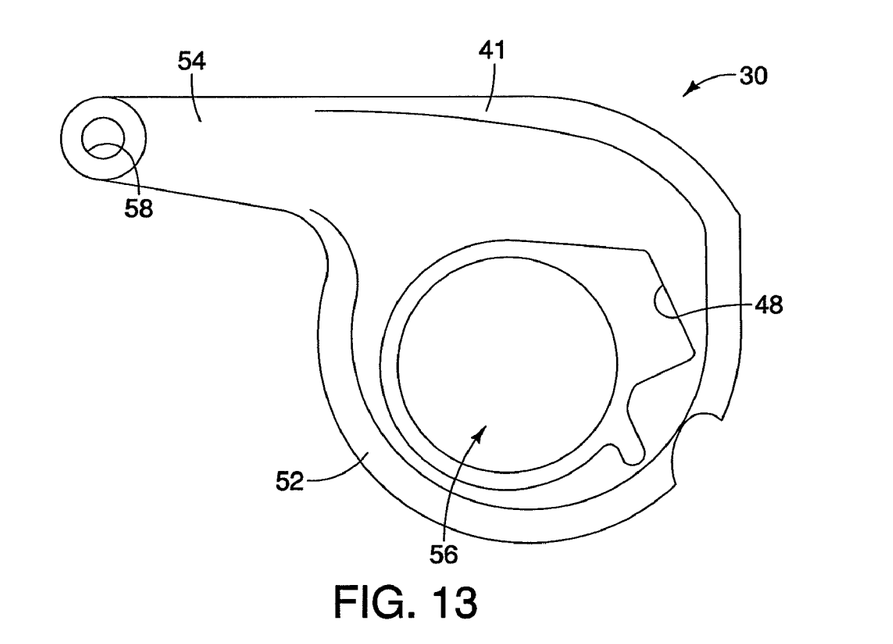
FIG. 13 is a second side elevational view of the base member of the bicycle component actuating device.
Figure 14:
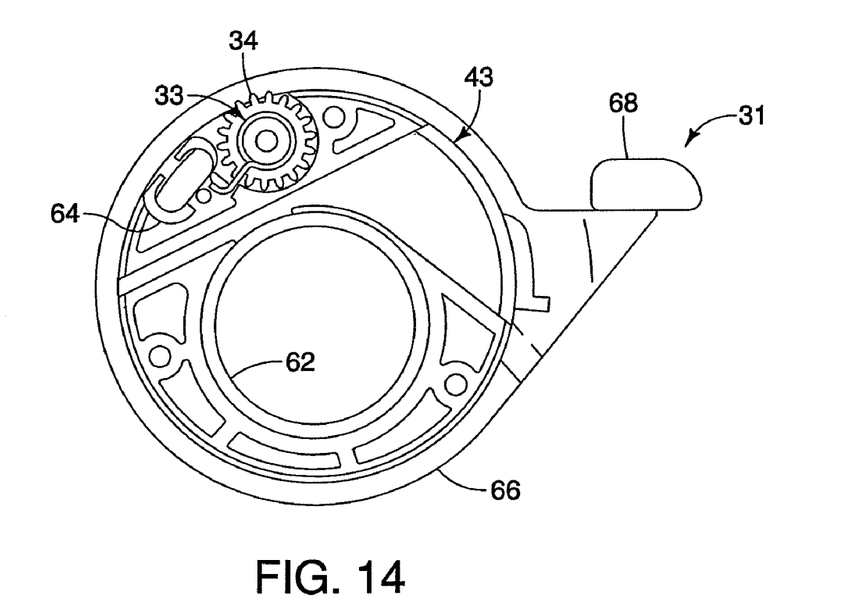
FIG. 14 is a side elevational view of the cover member, the pinion member and the first user operating member of the bicycle component actuating device.
Figure 15:
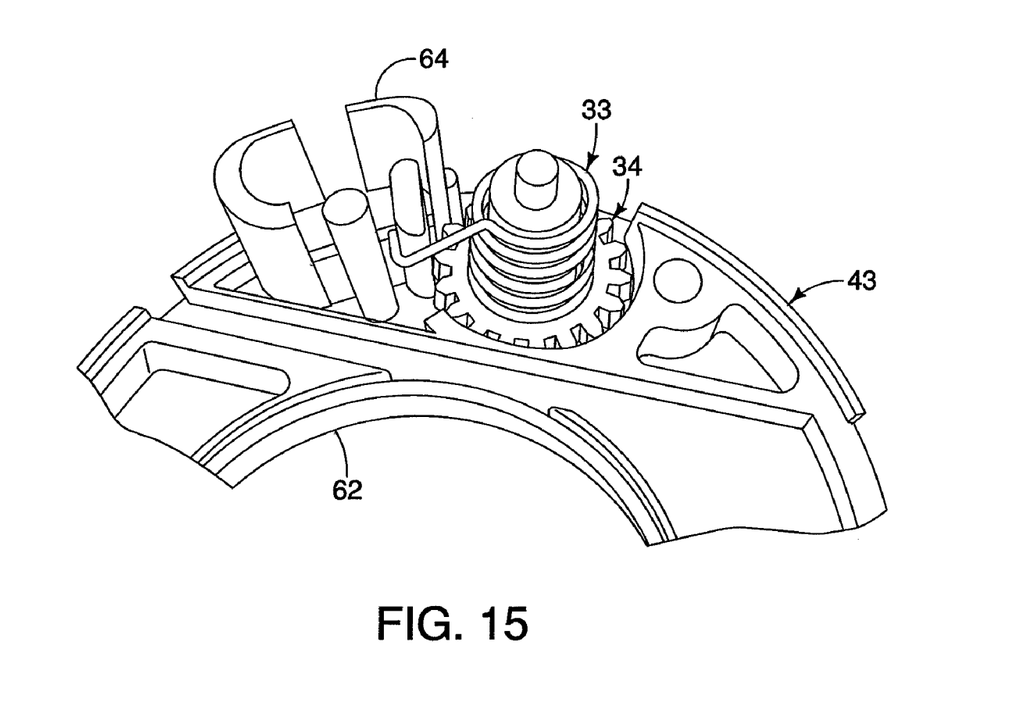
FIG. 15 is an enlarged perspective view of a part of the cover member with the pinion and the biasing element installed on the cover member.

As seen in FIGS. 4 to 7, 12 and 13, the main body part 41 has a tube mounting structure 52 and an inner wire guide structure 54. The main body part 41 is preferably constructed of a non-metallic material such as hard, rigid plastic material. The tube mounting structure 52 has a handlebar or tube receiving bore 56 for receiving the handlebar 16 therethrough. The tube receiving bore 56 has a center mounting axis A. The tube receiving bore 56 has a diameter that is slightly larger than the diameter of the handlebar 16 for receiving the end portion of the handlebar 16 therein. When the bicycle component actuating device 12 is mounted to the end portion of the handlebar 16, the tube receiving bore 56 has its center mounting axis A generally coincident with the center mounting axis of the end portion of the handlebar 16. As seen in FIGS. 9 to 11, the center mounting axis A of the tube receiving bore 56 is offset from a rotational axis B of the first user operating member 31, but parallel to the rotational axis B of the first user operating member 31. As seen in FIGS. 8, 12 and 13, the inner wire guide structure 54 has an inner wire guide passageway 58 for receiving the inner wire 24a. The inner wire guide passageway 58 communicates with an annular recess 60 that rotatably receives the first user operating member 31. Because of this arrangement in which the center mounting axis A of the tube receiving bore 56 is offset from the rotational axis B of the first user operating member 31, more available space can be obtained within the main body part 41. Therefore, freedom degree on how to arrange inner components (such as the inner wire 24a) within the main body part 41 is increased.

The cover part 43 is releasably coupled to the main body part 41 by three screws 61 to overlie the annular recess 60 and retain the first user operating member 31 within the annular recess 60. The cover part 43 is preferably constructed of a non-metallic material such as hard, rigid plastic material. The cover part 43 has a handlebar receiving opening 62 that receives the inner support ring 44. The inner support ring 44 is made of a metallic material and supports (reinforces) the cover part 43. The cover part 43 also preferably has a guiding structure 64 for slidably supporting the locking member 35.

On end of the pinion 34 is rotatably supported in a recess in the cover part 43, while the other end of the pinion 34 is rotatably supported in a recess in the main body part 41. The biasing element 33 is a torsion spring that has its coiled portion mounted on a shaft portion 34a of the pinion 34. One end of the biasing element 33 is disposed in a hole in the gear portion 34b of the pinion 34. The other end of the biasing element 33 engages a part of the guiding structure 64 that slidably supports the locking member 35. The biasing element 33 is installed in an unloaded state as seen in FIG. 9. Then the first user operating member 31 is rotated with respect to the body part 41 (i.e., in a counterclockwise direction in FIGS. 9 to 11) from the preloaded state of FIG. 9 to the first operating position state of FIG. 10. The teeth of the gear portion 34b of the pinion 34 engage the first user operating member 31, as discussed below, to support the first user operating member 31 as it is rotated with respect to the body part 41. Thus, the cover part 43 of the base member 30 functions as an outer support ring disposed on the inner support ring 44 such that the outer support ring (i.e., the cover part 43) rotatably supports the first user operating member 31 via the pinion 34.

As best seen in FIGS. 10 and 11, the first user operating member 31 is rotatably mounted relative to the base member 30 for rotation between a first operating position and a second operating position about a rotational axis B that is parallel to and offset from the center mounting axis A of the tube mounting structure 52. Thus, the first user operating member 31 is movably mounted relative to the base member 30 for rotation between the first operating position (FIG. 10) and the second operating position (FIG. 11) about the rotational axis B in an operating plane P that intersects with the rotational axis B (e.g., in this embodiment, the operating plane P is perpendicular to the rotational axis B at the point of intersection). The first user operating member 31 is biased relative to the base member 30 to the first operating position by the biasing element 33.

Figure 5:
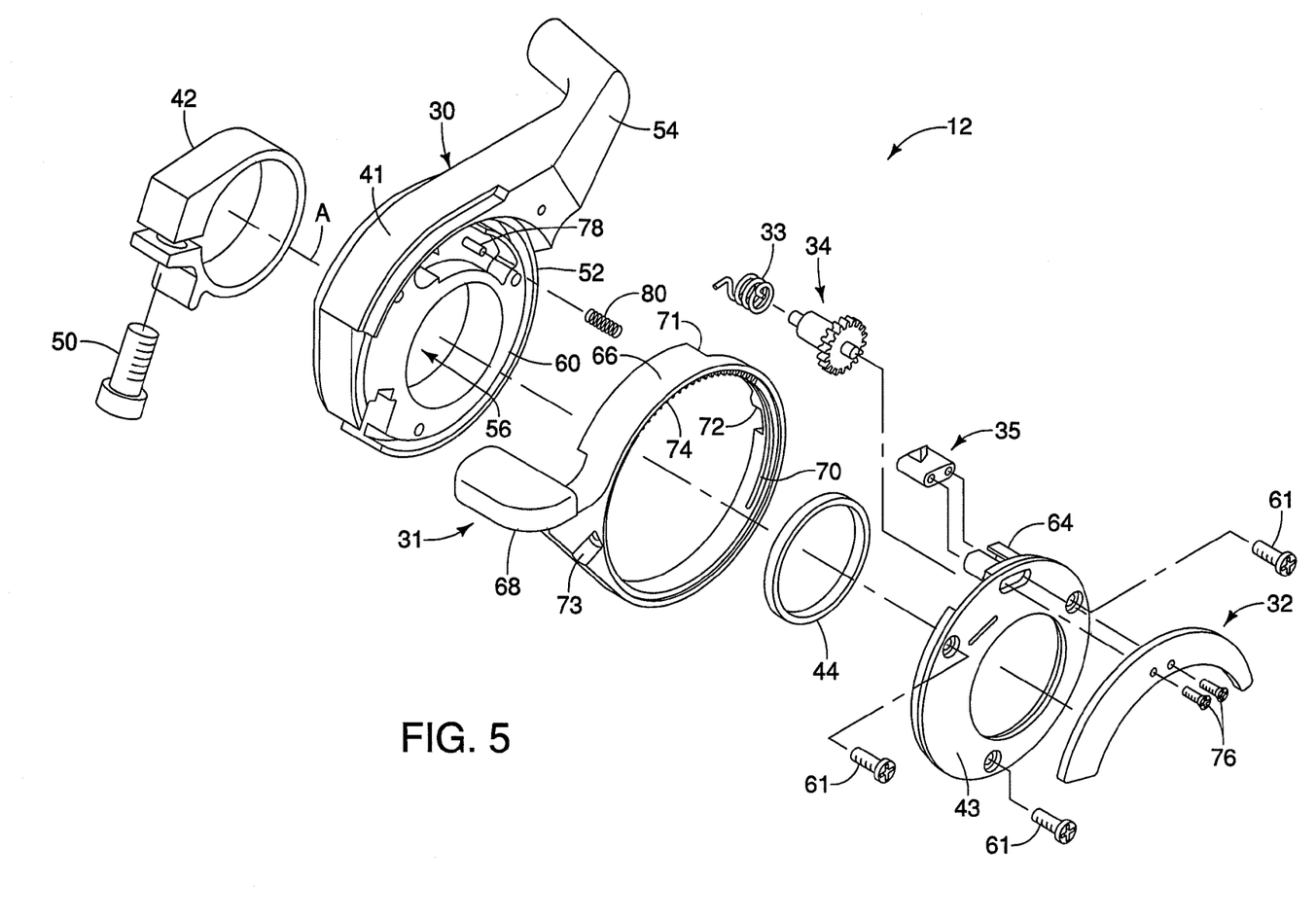
FIG. 5 is an exploded outer side perspective view of the bicycle component actuating device illustrated in FIG. 4.
Figure 6:
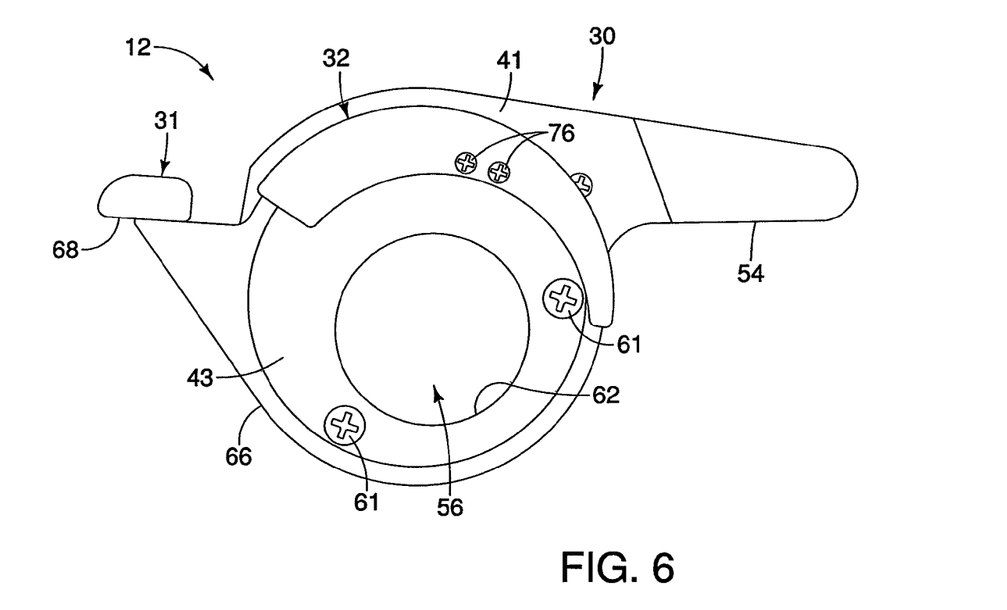
FIG. 6 is an outer side elevational view of the bicycle component actuating device illustrated in FIGS. 4 and 5.
Figure 7:
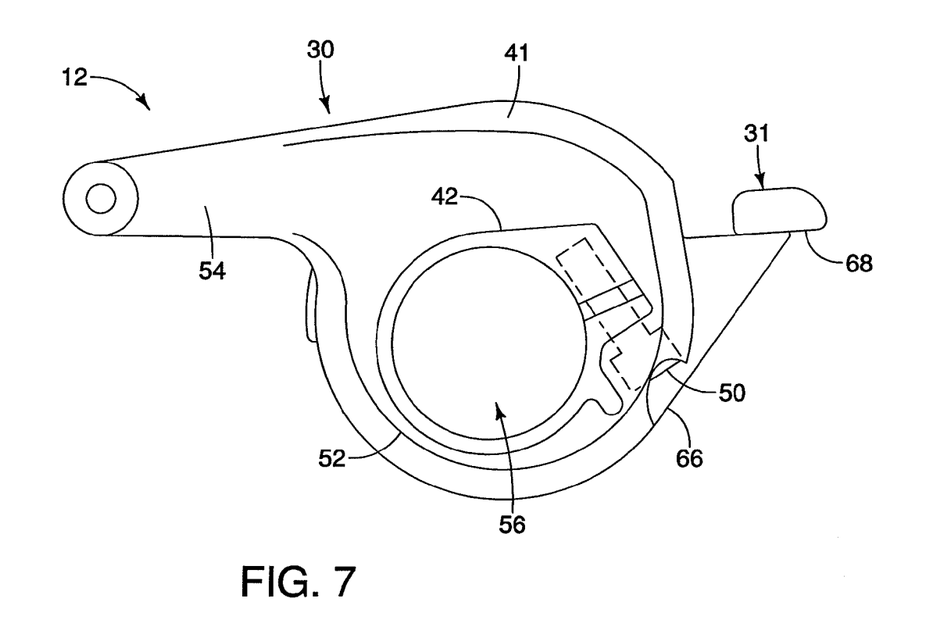
FIG. 7 is an inner side elevational view of the bicycle component actuating device illustrated in FIGS. 4 to 6.
Figure 16:
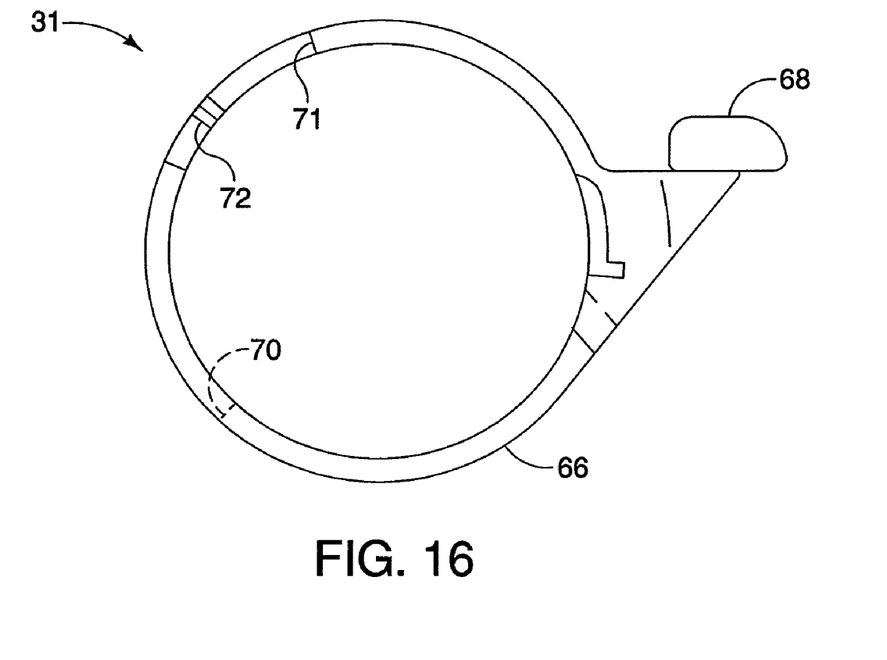
FIG. 16 is a first side elevational view of the first user operating member of the bicycle component actuating device.
Figure 17:
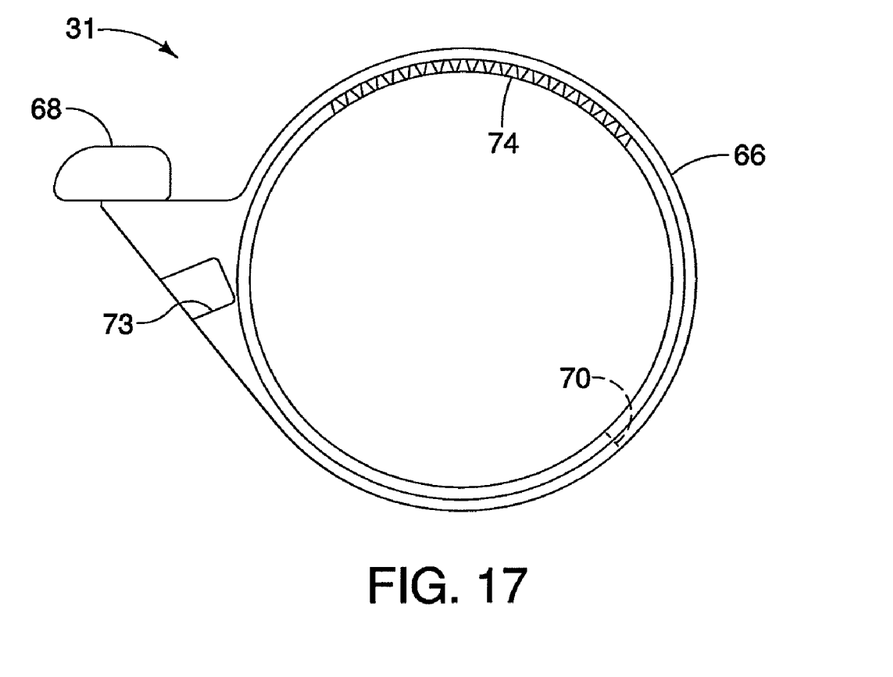
FIG. 17 is a second side elevational view of the first user operating member of the bicycle component actuating device.
Figure 18:
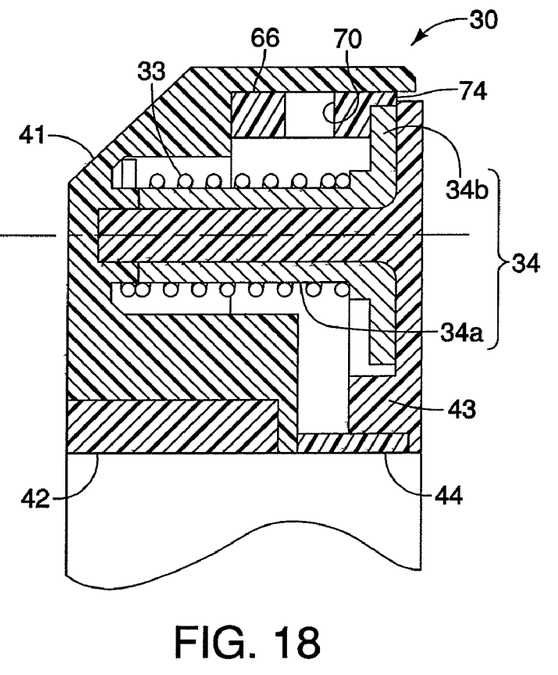
FIG. 18 is a diagrammatic partial cross sectional view of the bicycle component actuating device, which illustrates the curved rack and pinion arrangement between the first user operating member and the pinion.
Figure 19:
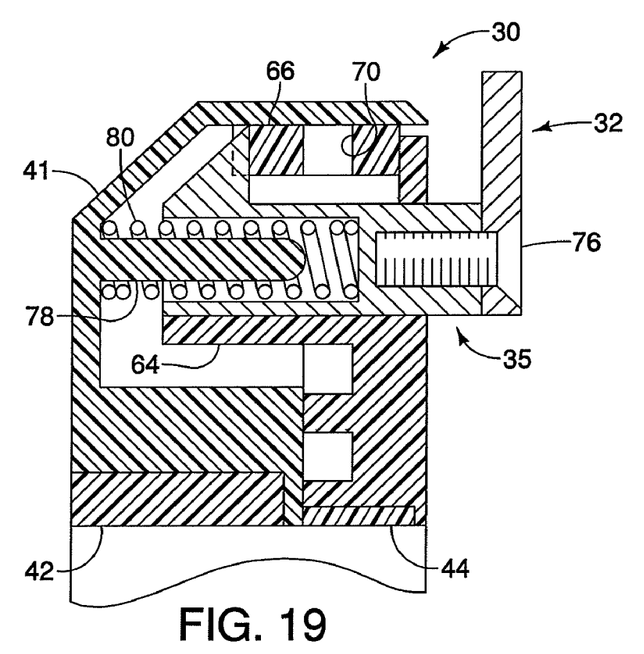
FIG. 19 is a partial cross sectional view of the bicycle component actuating device, which illustrates the curved rack and pinion arrangement between the first user operating member and the pinion.

Basically, as best seen in FIGS. 5, 16 and 17, the first user operating member 31 includes a ring shaped portion 66 and a user engagement portion 68 extending from the ring shaped portion 66. The ring shaped portion 66 of the first user operating member 31 is rotatably mounted between the main body part 41 and the cover part 43 about a rotational axis B. The first user operating member 31 can be moved in a single continuous progressive movement from the first (unlocked, low damping characteristic, low spring-rate or short stroke) operating position (FIG. 10) to the second (locked, high damping characteristic, high spring-rate or a long stroke) operating position (FIG. 11).

As best seen in FIGS. 5, 16 and 17, the ring shaped portion 66 of the first user operating member 31 includes an inner wire pass through slot 70, a first abutment 71, a second abutment 72, an inner wire attachment structure 73 and a plurality of teeth forming a curved rack 74. The inner wire pass through slot 70 is configured and arranged for permitting the inner wire 24a to pass through the ring shaped portion 66 of the first user operating member 31. The inner wire attachment structure 73 is configured and arranged for attaching the inner wire 24a thereto. Thus, as the first user operating member 31 is rotated, the inner wire 24a is pulled in one rotational direction and releases in the other rotational direction.

The first and second abutments 71 and 72 are arranged on a side edge of the ring shaped portion 66 of the first user operating member 31 that faces the tube mounting structure 52 of the main body part 41. As seen in FIGS. 8, 12 and 13, the first and second abutments 71 and 72 are selectively engaged with the locking member 35 to lock the first user operating member 31 in the first and second operating positions, respectively. In other words, the locking member 35 engages the first abutment 71 to hold the first user operating member 31 in the first operating position and engages the second abutment 71 to hold the first user operating member 31 in the second operating position.

The teeth of the curved rack 74 are disposed on the inner peripheral surface of the ring shaped portion 66 along the side edge of the ring shaped portion 66 of the first user operating member 31 that faces the cover part 43. The teeth of the curved rack 74 are engaged with the teeth of the gear portion 34b of the pinion 34. The curved rack 74 and the gear portion 34b of the pinion 34 constitutes a curved rack and pinion arrangement or winding mechanism for rotatably supporting the first user operating member 31 on the base member 30. The pinion 34 is rotatable about an axis C that is parallel to the rotational axis B of the first user operating member 31. The first user operating member 31 is biased relative to the base member 30 to the first operating position by the biasing element 33 that operatively coupled to rotate the pinion 34 in a rotational direction to bias the first user operating member 31 towards the first operating position.

Because the biasing element 33 is built-into the winding mechanism (curved rack and pinion arrangement) of bicycle component actuating device 12 to return the first user operating member 31 to the first operating position, there is no need for a strong return-spring in the suspension setting mechanism 23 to aid in returning the first user operating member 31 to the first operating position. Rather, the suspension setting mechanism 23 can be designed with a relatively weak return spring such that only a small pulling force occurs in the inner wire 24a to aid in returning the first user operating member 31 to the first operating position. In other words, the biasing element 33 preferably cooperate with another return spring mounted into e.g. the suspension setting mechanism 23 to return the winding mechanism to the first operating position such that it is possible to use a relatively weak spring in the suspension setting mechanism 23. Further, even if the center mounting axis A of the tube receiving bore 56 is offset from the rotational axis B of the first user operating member 31, it is possible to smoothly rotate the first user operating member 31.

Figure 20:
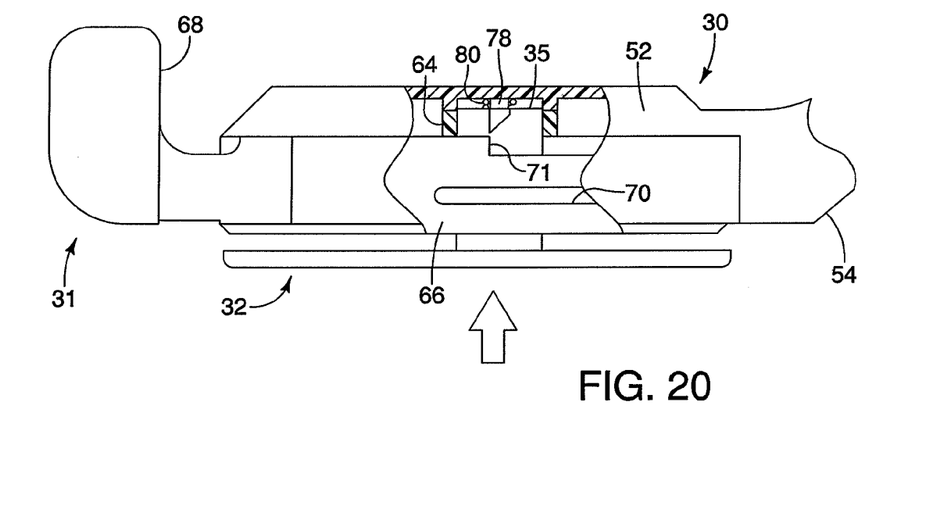
FIG. 20 is a top plan view of the bicycle component actuating device, with a portion broken away to reveal the release/locking mechanism with the first user operating member in the first operating position state in which the front suspension is in one of a suspension operating position, a low damping characteristic position, a low spring-rate position and a short stroke position.
Figure 21:
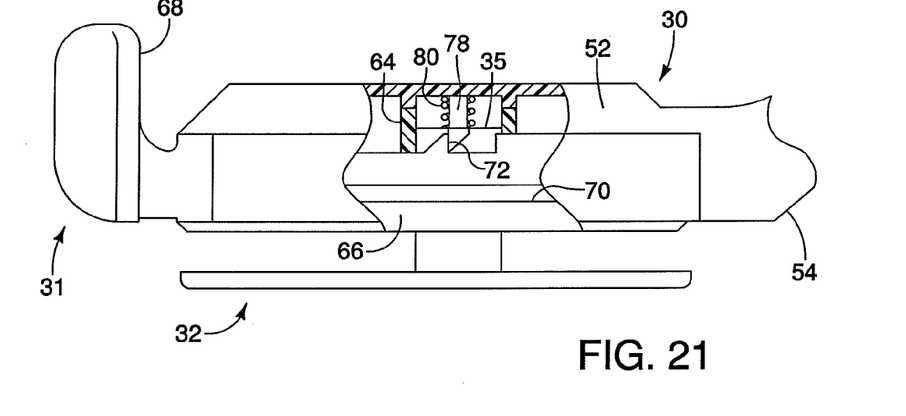
FIG. 21 is a top plan view of the bicycle component actuating device, with a portion broken away to reveal the release/locking mechanism with the first user operating member in the second operating position state in which the front suspension is in one of a suspension lockout position, a high damping characteristic position, a high spring-rate position and a long stroke position.

As best seen in FIGS. 20 and 21, the second user operating member 32 is movably mounted relative to the base member 30 for selective movement between a non-releasing position and a releasing position. In particular, the second user operating member 32 is fixed to the locking member 35 by a pair of screws 76. The locking member 35 is retained between the tube mounting structure 52 of the main body part 41 and the cover part 43. The guiding structure 64 of the cover part 43 slidably supports the locking member 35. The tube mounting structure 52 of the main body part 41 has a post 78 that supports a biasing element 80, which engages the locking member 35. The biasing element 80 applies an urging force on the locking member 35 to bias the locking member 35 to a locking position. Since the second user operating member 32 is fixed to the locking member 35, the biasing element 80 biases the second user operating member 32 to the non-releasing position. Thus, the second user operating member 32 moves the locking member 35 to release the first user operating member 31 when second user operating member 32 is the moved from the non-releasing position to the releasing position. The second user operating member 32 is movably along the operating path that extends laterally with respect to the first operating plane of the first user operating member 31. The second user operating member 32 is linearly slidable along its operating path. The operating path of the second user operating member 32 is parallel to the rotational axis B of the first user operating member 31.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the bicycle component actuating device, the following directional terms "forward, rearward, above, downward, vertical, horizontal, below and transverse" as well as any other similar directional terms refer to those directions of a bicycle equipped with the bicycle component actuating device. Accordingly, these terms, as utilized to describe the bicycle component actuating device should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component actuating device comprising:
    a base member including a tube mounting structure having a tube receiving bore with a center mounting axis;
    a first user operating member rotatably mounted relative to the base member for rotation between a first operating position and a second operating position about a rotational axis that is parallel to and offset from the center mounting axis of the tube mounting structure, the rotational axis of the first user operating member being located within the tube receiving bore of the tube mounting structure; and
    a locking member movably mounted relative to the base member for selective movement between a locking position to lock the first user operating member in the second operating position and a releasing position to release the first user operating member from the second operating position.

2. The bicycle component actuating device according to claim 1, wherein
    the first user operating member is rotatably supported on the base member by a curved rack and pinion arrangement.

3. The bicycle component actuating device according to claim 2, wherein
    the curved rack and pinion arrangement includes a curved rack formed on the first user operating member and a pinion rotatably supported on the base member.

4. The bicycle component actuating device according to claim 3, wherein
    the pinion is rotatable about an axis that is parallel to the rotational axis of the first user operating member.

5. The bicycle component actuating device according to claim 3, wherein
    the first user operating member is biased relative to the base member to the first operating position by a biasing element that operatively coupled to rotate the pinion in a rotational direction to bias the first user operating member towards the first operating position.

6. The bicycle component actuating device according to claim 1, wherein
the base member further includes an inner support ring and an outer support ring disposed on the inner support ring with the outer support ring rotatably supporting the first user operating member.

7. The bicycle component actuating device according to claim 1, wherein
the first user operating member includes a ring shaped portion and a user engagement portion extending from the ring shaped portion.

8. The bicycle component actuating device according to claim 1, wherein
the base member includes an inner wire guide structure and the first user operating member includes a wire attachment structure arranged relative to the inner wire guide structure of the base member.

9. The bicycle component actuating device according to claim 1, further comprising
a second user operating member movably mounted relative to the base member for selective movement between a non-releasing position and a releasing position for selectively operating the locking member to release the first user operating member when moved from the non-releasing position to the releasing position.

10. The bicycle component actuating device according to claim 9, wherein
the second user operating member is movably along the operating path that extends laterally with respect to the first operating plane of the first user operating member.

11. The bicycle component actuating device according to claim 9, wherein
the operating path of the second user operating member is parallel to the rotational axis of the first user operating member.

12. The bicycle component actuating device according to claim 1, wherein the first user operating member includes a ring shaped portion that fully surrounds a periphery of the tube receiving bore.

13. A bicycle component actuating device comprising:
a base member including a tube mounting structure having a tube receiving bore with a center mounting axis;
a first user operating member rotatably mounted relative to the base member for rotation between a first operating position and a second operating position about a rotational axis that is parallel to and offset from the center mounting axis of the tube mounting structure; and
a locking member movably mounted relative to the base member for selective movement between a locking position to lock the first user operating member in the second operating position and a releasing position to release the first user operating member from the second operating position,
the base member further including an inner support ring and an outer support ring disposed on the inner support ring with the outer support ring rotatably supporting the first user operating member,
the inner support ring being made of a metallic material and the outer support ring made of a non-metallic material.

14. A bicycle component actuating device comprising:
a base member including a tube mounting structure having a tube receiving bore with a center mounting axis;
a first user operating member rotatably mounted relative to the base member for rotation between a first operating position and a second operating position about a rotational axis that is parallel to and offset from the center mounting axis of the tube mounting structure;
a locking member movably mounted relative to the base member for selective movement between a locking position to lock the first user operating member in the second operating position and a releasing position to release the first user operating member from the second operating position; and
a second user operating member movably mounted relative to the base member for selective movement between a non-releasing position and a releasing position for selectively operating the locking member to release the first user operating member when moved from the non-releasing position to the releasing position,
the second user operating member being linearly slidable along the operating path.

15. A bicycle component actuating device comprising:
a base member including a tube mounting structure having a tube receiving bore with a center mounting axis;
a first user operating member rotatably mounted relative to the base member for rotation between a first operating position and a second operating position about a rotational axis, the first user operating member is rotatably supported on the base member by a curved rack and pinion arrangement, the rotational axis of the first user operating member being located within the tube receiving bore of the tube mounting structure; and
a locking member movably mounted relative to the base member for selective movement between a locking position to lock the first user operating member in the second operating position and a releasing position to release the first user operating member from the second operating position.

16. The bicycle component actuating device according to claim 15, wherein
the curved rack and pinion arrangement includes a curved rack formed on the first user operating member and a pinion rotatably supported on the base member.

17. The bicycle component actuating device according to claim 16, wherein
the pinion is rotatable about an axis that is parallel to the rotational axis of the first user operating member.

18. The bicycle component actuating device according to claim 16, wherein
the first user operating member is biased relative to the base member to the first operating position by a biasing element that operatively coupled to rotate the pinion in a rotational direction to bias the first user operating member towards the first operating position.

19. The bicycle component actuating device according to claim 15, wherein
the first user operating member includes a ring shaped portion that fully surrounds a periphery of the tube receiving bore.

* * * * *